(No Model.)  3 Sheets—Sheet 2.

C. W. AYTON.
ELECTRIC METER.

No. 487,703.  Patented Dec. 13, 1892.

Witnesses
W. H. Courtland
Nellie L. Pope.

Inventor
C. W. Ayton

By his Attorney
Edward P. Thompson

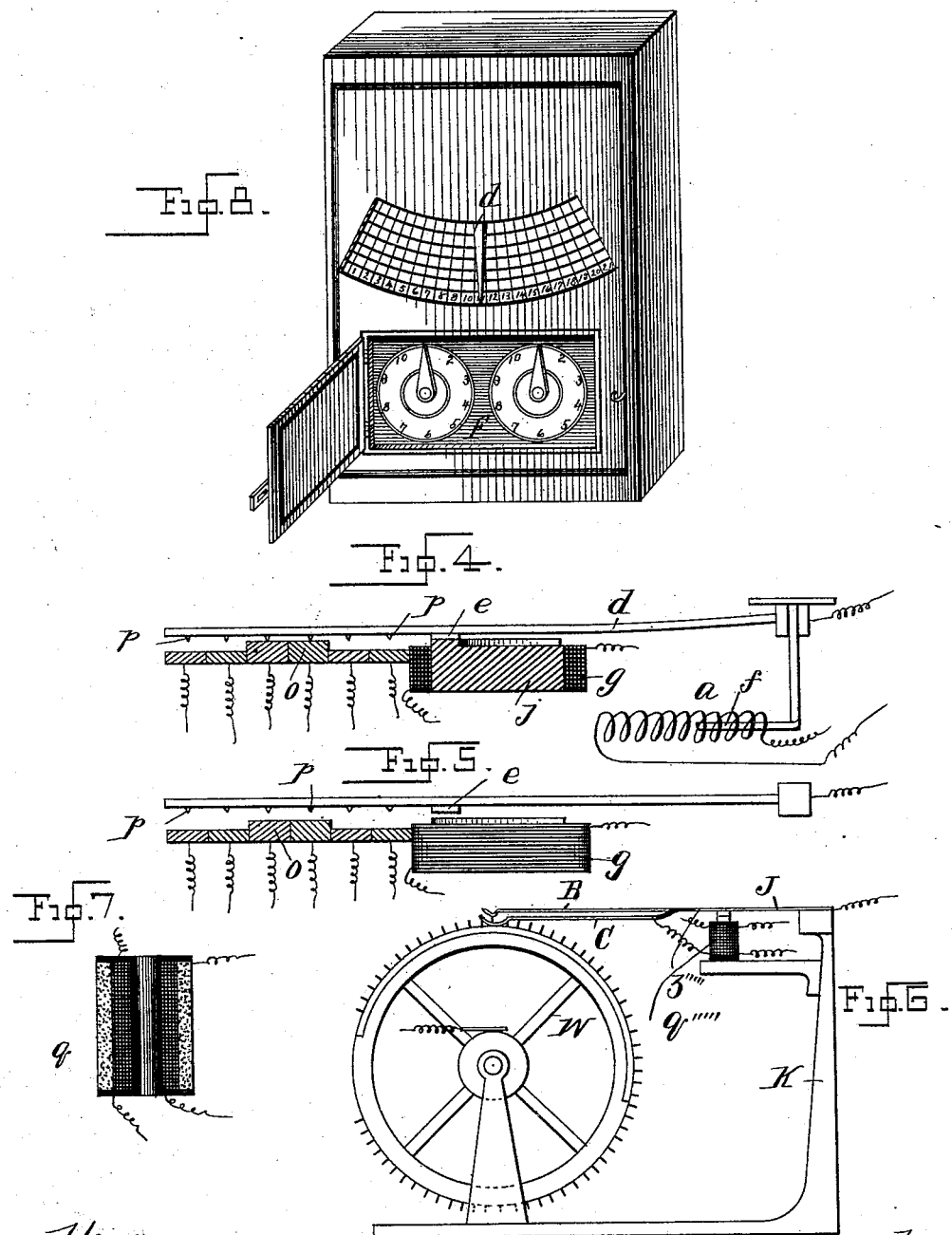

UNITED STATES PATENT OFFICE.

CHARLES W. AYTON, OF NEW YORK, N. Y.

ELECTRIC METER.

SPECIFICATION forming part of Letters Patent No. 487,703, dated December 13, 1892.

Application filed December 5, 1891. Serial No. 414,083. (No model.)

*To all whom it may concern:*

Be it known that I, CHARLES W. AYTON, a citizen of the United States, and a resident of New York, in the county and State of New York, have invented certain new and useful Improvements in Electric Meters, of which the following is a specification.

In a former United States patent granted to me on September 22, 1891, No. 459,863, I have set forth and claimed a certain construction of instrument for measuring and recording electric currents. My present invention relates to improvements upon the device and system shown, described, and claimed in said patent.

By my invention I make use of the needle of an ammeter or similar instrument, such as a galvanometer. At periods of time a magnet attracts the needle in a direction at right angles to its normal direction of movement, whereby it acts as a circuit-closer and closes one or more circuits, according to the amount of current which actuates the needle. The currents in these circuits energize electromagnets, which operate a circuit-breaker. In the last-named circuit is a magnet, which intermittently vibrates ratchet and ratchet-wheel governing a suitable indicating device.

In order to more fully set forth the invention in all its details, so that it may be understood by those versed in the art, drawings are hereto annexed and explained in the following manner. Like letters and figures refer to like parts. Some of the figures are shown in full elevation and some in diagram, while others are partly in diagram and partly in full, substantially as the device would appear in practical operation.

Figure 1:
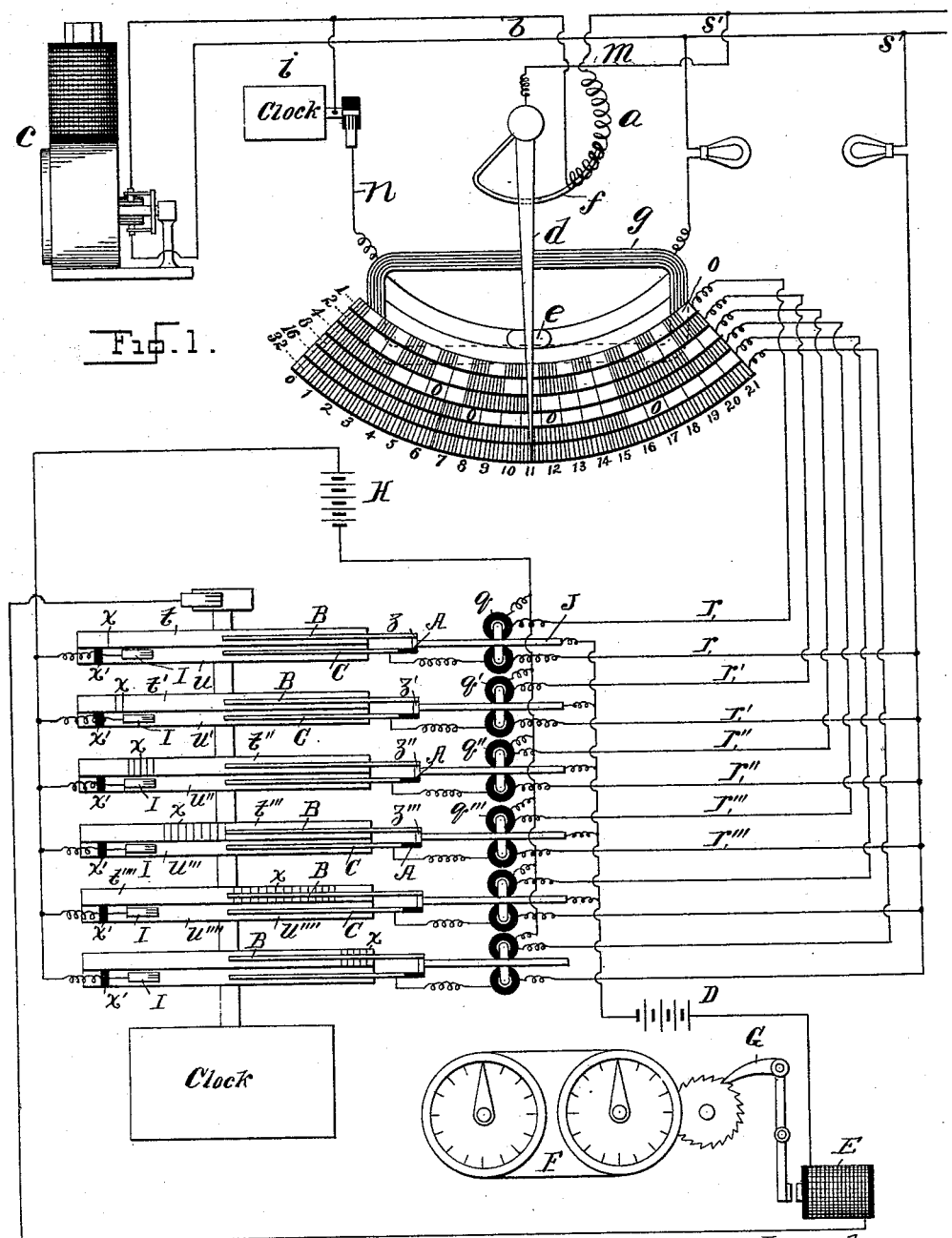
Figure 2:
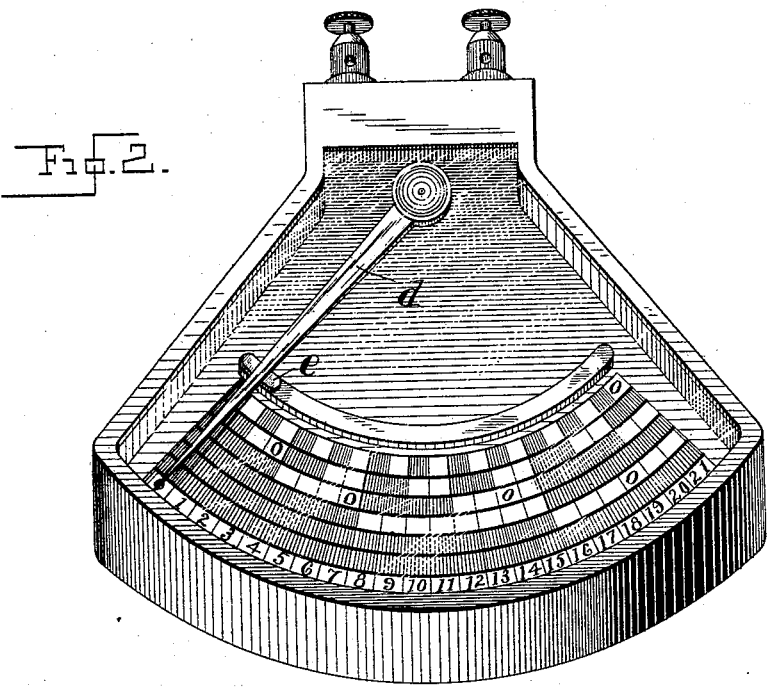
Figure 3:
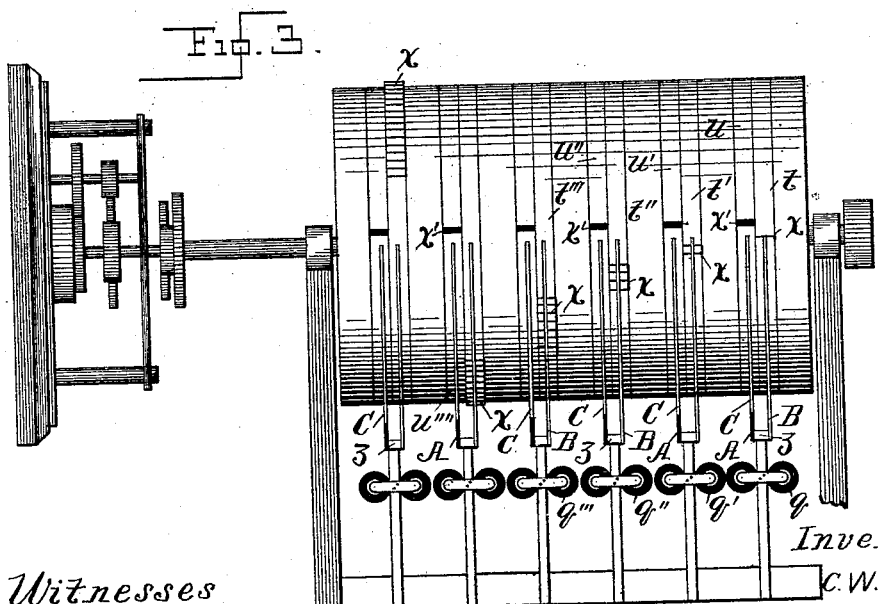

Figure 1 is intended to set forth the circuits, so that they may be followed throughout the system. Such parts as may be necessary to identify the elements of the device are shown mostly in outline. For the sake of clearness in explanation the parts of the device are widely separated, having the false appearance of being made up of many devices. In this figure the generator, supposed to be at the central station, is also shown in circuit, so that the circuits may be traced through the system of electrical distribution. Fig. 2 is a perspective view of the ammeter used by me in my invention, the same being considerably modified over those ordinarily employed. Fig. 3 is an elevation of the complete circuit-interrupter for that circuit which governs the indicating device. It is operated by clockwork, which is shown at the left of the figure. Fig. 4 is a section of part of the ammeter, being taken in such a manner as to illustrate how the needle may act as a circuit-closer. The principal elements of the ammeter are shown. The phase of the needle is that in which it closes the circuit. Fig. 5 is a somewhat similar view of that seen in Fig. 4; but the phase of the needle is such that the circuit is open. The needle is free to place itself in any position according to the strength of the current in the main line. Fig. 6 is a side elevation of the circuit-interrupter seen in Fig. 3. The phase of this part of the device is that which occurs during operation. Fig. 7 is a sectional view of one of the magnets alluded to in the previous figure, the same being provided with a double winding for the purpose hereinafter described. Fig. 8 is a perspective showing how the meter looks when in practice, being in a compact form suitable for handling and setting up wherever desirable. The needle of the ammeter is allowed to be in plain sight, so that any one may see just how much current is being consumed at any particular moment.

The device comprising my invention consists of the combination of an ammeter whose coil is $a$, which is included in the main line $b$, connected to the generator or dynamo $c$; a needle $d$, whose central portion carries an armature $e$ and which is provided with a core $f$, movable in the coil $a$; a magnet $g$, located under said armature and included in circuit with the circuit-closer $h$, (seen, also, in a different direction and on an enlarged scale and separated by itself in Fig. 1,) which is operated circularly by means of the clock $i$; a pole-piece $j$ for said magnet $g$, located directly under the said armature and having the shape of an arc whose center is the center about which the needle rotates, the circuits of the coil $a$ and magnet $g$ being lettered, respectively, $m$ and $n$ and being taken as branch circuits from the main line $b$; arc-shaped strips, indicated in order by the numerals 1, 2, 4, 8, 16, and 32, insulated from each other and having a common center, which is that about which the needle $d$ rotates; projections $o$ in greater or less number upon said strips and variously located relatively to one another; contact-points $p$, extending downward from the needle and in normal condition of the latter just escaping said projections; electro-magnets $q\ q'\ q''\ q'''$, &c., each in circuit with corresponding strips, respectively, 1 2 4, &c., and with the needle $d$, (being an open circuit when the needle is up, and closed when the needle is down,) the circuits being lettered, respectively, $r\ r'\ r''\ r'''$, &c., and being taken from the main line as a matter of convenience at the points $s$ and $s'$; conducting-rings $t\ t'\ t''\ t'''$, &c., electrically connected to the rings $u\ u'\ u''\ u'''$, &c., upon which rests a brush $l$, the electric connections being made through the spokes $w$; teeth $x$ upon the outer periphery of said rings, the number of teeth on the rings $t\ t'\ t''\ t'''$, &c., being, respectively, one, two, five, nine, and seventeen; rings $u\ u'\ u''\ u'''$, &c., parallel to said first-named rings, attached thereto and insulated therefrom and intercepted in their outer contour by insulating-pieces $x'$; a forked brush having two spring-tines for each of the pairs of said rings, the brushes being lettered $z\ z'\ z''\ z'''$, &c., the tines both escaping but located directly opposite the said rings, and the tines being insulated from one another as to each brush by insulation A, the tines which are located above the rings $t\ t'\ t''$, &c., being lettered B and those above the rings $u\ u'\ u''$, &c., C, and other details, as hereinafter described.

The tines at their outer ends, where they are above or opposite the rings, are bent upward into a kind of curve, so that when the tines are pulled against the rings, which rotate, they will slide relatively to the rings without stopping the rings. Normally the tines do not touch the rings, nor do they one or both touch the teeth on the rings. The tines B are in circuit with the local battery D, which includes the magnet E for operating the recording or indicating device F, and which also includes the rings $t\ t'\ t''$, &c., in such a manner that when the teeth come into contact with the tines, as hereinafter described, the circuit will be intermittently broken and cause the magnet to vibrate the ratchet G.

The tines C are in circuit with the magnets $q\ q'\ q''\ q'''$, &c., as to their second winding and with the local battery H, which evidently may be replaced by the current from the main line. The rings $u\ u'\ u''\ u'''$, &c., are connected into this circuit by means of the brushes $l$, which rest thereon.

The elasticity of the tines of the forks $z\ z'\ z''$, &c., should be such that when the magnets $q\ q'\ q''\ q'''$, &c., are inserted into an electric circuit of such strength as to pull the armature into contact with the poles of the said magnets the said tines should both be brought into contact with the rings, and even when the teeth lift up the tines B the tines C should not leave the rings $u\ u'\ u''\ u'''$, &c. The magnets in this case serve to first pull down the tines and then to hold them down during a complete revolution of the rings, when the insulations $x'\ x''\ x'''$, &c., interrupt the circuit and the tines resume their normal positions. A part of the elasticity is due to the shanks J, which hold and support the forks. These shanks are riveted to the standards K.

The teeth $x$ when looked at as in Fig. 6 are arranged so that they are circularly displaced at equal distances. They may be imagined as located on the surface of a cylinder and the cylinder rotated while the tine B is held against them. This tine will, if the cylinder is rotated at a uniform rate, leave the teeth at equal intervals of time.

The projections or at least their divisions in the arc are numbered "1 2 3 4 5 6 7 8 9 10 11 12 13 14 15 16 17 18 19 20 21" in an arc of a circle, so that they may indicate units of current. For example, if the needle moves to "10" it means that ten ampères are passing along the main line. If it moves to "1," it means that one ampère is being consumed.

The operation of the meter is as follows: Let it be assumed that one unit of current is being consumed. The needle is attracted through the medium of the core $f$ until it becomes located above the projection $o$, which is upon the strip 1. The clock is uniformly rotating the circuit-closer $h$ synchronously with the rate of rotation of the rings $t\ t'\ t'''\ u\ u'\ u''$, &c. As the system is supposed to be starting up, the circuit-closer is in such a position that the circuit $n$ becomes closed for an instant, which causes the armature $e$ to be attracted until the point $p$ nearest the center of rotation touches the projection underneath. One of the coils of the first magnet $q$ is therefore included in an active circuit and causes the fork to be drawn downward. When the tine C touches the ring $u$, the other coil of the magnet $q$ becomes energized and continues to hold the tine until the rings have rotated so far that the insulation $x'$ interrupts the circuit and the tines both return to their normal positions. While the projection $x$ is passing under the tine B it touches the same, and thereby closes a circuit through the magnet E and causes the same to rotate the ratchet through the distance of one tooth thereon—i. e, the indicator F shows that one unit of current has been used. In the further operation of the device the explanation is about the same, at least in nature. It may easily be supposed that after the needle has been at No. "1" on the scale of units of current that the current may increase to several units before the circuit-closer has made but a fraction of a revolution. It is nevertheless true, however, that the single unit will be recorded because the tine B is held down in the path of the tooth $x$ during one complete revolution of the rings $t\ u$. If the needle should move to the projection $o$ at No.

"2" on the scale of units of current, the magnet $q'$ will cause the two teeth $x$ on the ring $t'$ to close the circuit twice through the magnet E, and therefore the indicator will indicate and record two more units of current. The magnet E can never be included in circuit simultaneously by different tines, because it will be noticed that the teeth $x$ are circularly on different parts of a cylinder. It is unnecessary to go further into the details of explanation of the operation when the needle reaches other points on the scale, as the principle remains the same. It may be best that the rotation of the circuit-closer $h$, and therefore of the rings, should be about ten times per minute.

It should be stated that the tines B when attracted by the magnets $q$ $q'$, &c., should just escape the teeth $x$, except when a tooth is directly under the tine. Then it is evident that the tooth will act as a circuit-closer.

I claim as my invention—

1. An electric meter consisting of the combination of an electric indicator—such as, for example, an ammeter—a circuit-controller whose respective poles are attached to the needle of said ammeter and to points directly below the needle at any position which it may occupy for any current for which the ammeter is adapted, electro-magnets located in parallel in the circuit which includes said circuit-controller, the said poles below the said needle forming the terminals of the said magnets and the said magnets being lettered $q$, which are provided with second windings, forked electric terminals attached to the armatures of said magnets $q$ $q'$ $q''$, &c., the one tine of each fork normally just escaping projections upon a rotating ring, the said rings and tines being in a third independent circuit in parallel and the said rings rotating with a predetermined uniform speed, and including a magnet which controls a registering device, and the second tines being in circuit with the second windings of said magnets $q$ $q'$ $q''$ $q'''$, &c., and normally just escaping rings which are included in the same circuits, the said rings being complete electric conductors except as to a sufficiently-small part which serves as a circuit-interrupter, the said last-named rings rotating synchronously with the said first-named rings and provided with stationary brushes, which rest upon the rings and serve to make electric contact therewith, an armature upon said needle, and a magnet located under the said needle and sufficiently large to be under the needle in all of the latter's positions and included in a circuit which is closed once for every revolution of both of the two sets of rings.

2. An electric meter consisting of the combination of a registering device controlled by a magnet E, circuit-closers normally in open circuit with said magnet and controlled by magnets in independent electric circuits, an ammeter in the main line of an electric distribution system, the needle of the said ammeter being normally in open circuit with said second magnets, and an additional magnet so arranged as to be periodically closed and attract the said needle, for the purpose described.

3. An electric meter consisting of the combination of an ammeter having a graduated dial, a needle provided with an armature, a magnet over which said needle moves in its path, insulated contacts corresponding to the number of divisions of the dial and so located relatively to the needle that the same is adapted to come into contact with them, an electric-current generator from which a current flows and adapted to pass through the coils of said magnet at intervals, thereby attracting the said needle and bringing the same in electric connection with one of the said contacts, said contacts being in electric connection with corresponding magnets and a source of electricity, means, such as a clockwork, controlling a circuit-closer for closing and interrupting the circuit through the first-named electro-magnet at intervals, and a registering device controlled by a magnet E independent of the other named magnets and in open circuit with circuit-closers which are adapted to close a circuit through the magnet E a different number of times in a predetermined unit of time, the last-named circuit-closers being mounted upon a shaft adapted to rotate once for every one of said intervals of time above mentioned.

4. An electric meter consisting of the combination of a graduated dial, a vibratory needle mounted above the same, a magnet below said needle, a clock having electrical connection with said magnet, whereby the needle is dipped at a predetermined moment at the point of the dial over which it is resting, a series of magnets energized for each position, respectively, for each position of the needle, means for locking any one of said series of magnet-armatures in that position to which it has been brought by its magnet for a predetermined length of time, and circuit-closers carried by said armatures and adapted to close a circuit through a magnet which controls a registering or indicating device—such as, for instance, a series of geared wheels carrying pointers which move over suitable dials—the said circuit-closers last named consisting of rotary rings provided with projections and of tines of forks actuated by series of magnets above mentioned, the different rings having different numbers of projections and all the projections lying on different radial lines of the rings, which are formed upon a common cylindrical surface.

5. An electric meter consisting of the combination of a dial-face, a needle movable over but out of contact with said face, an armature connected to or forming part of said needle, a magnet, a circuit therefor, a circuit-controller whereby the needle may be pressed upon said face at any point at which it may happen to be, insulated contact-pieces located on said face and against which said needle comes in contact when pressed, as above mentioned, the said contacts being insulated from each other in a radial direction and the contacts being arc-shaped and provided with projections rising from the level of the said dial-face and each contact-piece being provided with the projections located in predetermined relative positions, a series of magnets, one or more of which are adapted to be placed in circuit with said needle and projections in virtue of the said needle being pressed thereon, as above stated, a series of rings corresponding to said magnets, rotary upon a common shaft and provided with teeth which are in circuit with a magnet controlling an indicating device, the teeth normally escaping fork-tines carrying the armatures which belong to said series of magnets, and means for locking down the said armatures for predetermined durations of time, whereby the teeth close the circuit through the magnet for operating the indicating device a number of times corresponding to the number of units of current being carried through the said meter.

6. The combination, with the needle of an ammeter, of a series of wheels forming an indicating device which is operated by an armature of an electro-magnet, and means for sending impulses through said magnet, consisting, substantially, of a series of circuit-closers in circuit with said magnet and controlled by magnets which are in circuit with contacts located under said needle which carries an armature in inductive relation to a magnet which is periodically energized by an electric current, the said series of magnets being provided with second windings in circuit with circuit-controllers which are controlled by the armatures of said series of magnets.

7. An electric meter consisting of the combination of a movable needle, arc-shaped insulated contacts concentrically arranged around the center of rotation of the said needle and located within the dipping distance of the said needle, a magnet controlling the dipping of said needle, means for periodically sending a current of electricity through the said magnet, and an indicating-instrument electrically connected to said contacts through the instrumentality of a series of circuit-closers independently operative by circuits which are closed by the periodically-closed currents which are adapted to flow through the said contacts, the said contacts being in open circuit normally with the said needle.

In testimony that I claim the foregoing as my invention I have signed my name, in presence of two witnesses, this 1st day of December, 1891.

CHARLES W. AYTON.

Witnesses:
EDWARD P. THOMPSON,
GEORGE T. MIATT.